United States Patent [19]

Dobbs et al.

[11] Patent Number: 5,767,988
[45] Date of Patent: Jun. 16, 1998

[54] METHOD AND APPARATUS FOR CONVERTING AN INK-JET PRINTER INTO A SCANNER AND COPIER

[75] Inventors: Michael D. Dobbs, Vancouver; Gary K. Cutler, Battle Ground; David B. Patton, Vancouver, all of Wash.; Wallace T. Thrash, Portland, Oreg.; Chris A. Rasmussen, Vancouver, Wash.

[73] Assignee: Hewlett-Packard Company, Palo Alto, Calif.

[21] Appl. No.: 601,421

[22] Filed: Feb. 13, 1996

Related U.S. Application Data

[63] Continuation of Ser. No. 113,875, Aug. 30, 1993, abandoned.

[51] Int. Cl.⁶ .................................................. H04N 1/04
[52] U.S. Cl. ............................................. 358/474; 358/401
[58] Field of Search .................................. 358/401, 472, 358/474, 483, 487; H04N 1/04

[56] References Cited

U.S. PATENT DOCUMENTS

| | | | |
|---|---|---|---|
| 3,272,918 | 9/1966 | Koli et al. | 178/6.6 |
| 3,560,641 | 2/1971 | Taylor et al. | 178/6.6 |
| 3,800,076 | 3/1974 | Koizumi | 178/6.6 |
| 4,069,486 | 1/1978 | Fox | 346/75 |
| 4,106,061 | 8/1978 | Burnett | 358/296 |
| 4,112,469 | 9/1978 | Paranjpe et al. | 358/296 |
| 4,266,250 | 5/1981 | Heinzl et al. | 358/285 |
| 4,302,782 | 11/1981 | Gunning et al. | 358/296 |
| 4,321,627 | 3/1982 | Hooker et al. | 358/286 |
| 4,475,130 | 10/1984 | Miller et al. | 358/335 |
| 4,496,984 | 1/1985 | Stoffel | 358/293 |
| 4,525,748 | 6/1985 | Carbone | 358/472 |
| 4,649,437 | 3/1987 | Watanabe | 358/286 |
| 4,651,229 | 3/1987 | Coli | 358/285 |
| 4,683,501 | 7/1987 | Carena et al. | 358/293 |
| 4,706,128 | 11/1987 | Tanioka et al. | 358/286 |
| 4,755,877 | 7/1988 | Vollert | 358/285 |
| 4,823,195 | 4/1989 | Ito | 358/285 |
| 4,839,741 | 6/1989 | Wilson | 358/293 |
| 4,851,925 | 7/1989 | Yamasaki et al. | 358/296 |
| 5,070,410 | 12/1991 | Hadley | 358/296 |
| 5,532,825 | 7/1996 | Lim et al. | 358/296 |
| 5,579,487 | 11/1996 | Meyerson et al. | 395/280 |

FOREIGN PATENT DOCUMENTS

| | | | |
|---|---|---|---|
| A0471369 | 2/1992 | European Pat. Off. | |
| 56-0039675 | 4/1981 | Japan | 358/472 |
| 57-0045774 | 3/1982 | Japan | 358/472 |
| 59-0228462 | 12/1984 | Japan | 358/472 |
| A2152326 | 7/1985 | United Kingdom | |

OTHER PUBLICATIONS

Apple Computer, Inc. of Cupertino, California, made the Image–Writer scanner device for Apple's dot matrix printer. Apple's Image–Writer device had an external trailing wire that coupled the scanner head output to the host computer.

*Primary Examiner*—Thomas L. Stoll

[57] ABSTRACT

A scanner is housed in a similar body to that of a removable printer ink jet cartridge and can be inserted in place thereof. The scanner includes a light source mounted on the scanner housing which is able to emit light through an aperture in the housing, a CCD array mounted on the housing to receive light reflected off the image, a lens positioned between the image and the CCD for focusing the reflected light on the CCD, scanner electronics coupled to the CCD array for converting the analog output of the CCD to image data, and means for selecting between optically scanning media or printing thereupon. The scanner electronics transmits the image data to a printer CPU via a flexible interconnect which is normally used to select the individual nozzles of the removable printer cartridge. The printer CPU can forward the image data to a host personal computer for permanent storage in a first mode or store the image data in printer memory for contemporaneous reproduction in a second copy mode.

24 Claims, 5 Drawing Sheets

METHOD AND APPARATUS FOR CONVERTING AN INK-JET PRINTER INTO A SCANNER AND COPIER

CROSS REFERENCE TO RELATED APPLICATION(S)

This is a continuation of application Ser. No. 08/113,875 filed on Aug. 30, 1993, now abandoned.

BACKGROUND OF THE INVENTION

1. Field of the Invention

This invention relates generally to optical scanners used to convert optical images into digital data for subsequent reproduction and/or manipulation, and more particularly to optical scanners used in conjunction with printers.

2. Description of the Related Art

Optical scanners have long been used to capture existing optical images so that they may be transferred, stored, or manipulated using a more convenient means, typically a digital computer. The scanner captures the image by illuminating the image with a light source and sensing reflected light. The presence or absence of reflected light at a particular point determines the image characteristics at that point. For a black and white image, the absence of reflected light indicates a black region, while the presence of reflected light indicates a white region. For gray scale images the intensity of the reflected light must also be measured to determine the intensity of the image. In the case of color, separate light sources or filters are sometimes used to detect the presence or absence of each color component.

Although use of scanners has shown significant increase in the recent past, the commercial acceptance of the individual scanner has been limited by its cost and consumption of precious office space. Although not as expensive as many other computer peripherals, e.g., laser printers, the additional cost can be prohibitively expensive, especially if the device is used only by a single user.

In addition to the cost, the consumption of space by a scanner may also be prohibitive. The computer user already has a computer, a monitor, a printer, and possibly a fax machine. The computer user, faced with steadily shrinking office space, has been reluctant to include additional computer peripherals in the confines of the user's immediate office space, especially if the device is not used frequently. However, this is exactly what is required for commercial success of the scanner. Commonly, peripherals that are not in constant use are relegated to a common office area where the device is shared by all of the people in the office. The effect of relocating the peripheral away from the user produces a productivity loss, resulting from walking to and from the device, proportional to the number of times the user must use the device. Further productivity is lost when the device is currently in use by another person in the office. Recently, manufacturers have attempted to address these concerns by combining computer peripherals into so-called multi-function-peripherals (MFPs) incorporating one or more of the following: printer, copier, facsimile and scanner. Typically, these devices are based around an electrophotographic (EP) engine. The EP engine executes a process by which a polymer toner is transferred onto a print media and then fused onto the media. Electrophotographic engines are being used in black and white copiers, printers, and facsimiles and thus provide a good base for MFPs. Color EP engines are available but are considerably more expensive than black and white EP engines. As a result, color EP engines are used in only the most cost insensitive applications, e.g., color proofing, and, consequently, have not been used as a platform for MFPs.

The MFP has not been widely accepted by the marketplace. The primary reasons being, once again, cost and space. Although their cost is less than the combined cost of the devices purchased separately, the MFP is still too expensive for each computer user to own one, especially considering that most computer users already own one or more of the devices, most frequently a printer. In many cases, users own less expensive printers, such as an ink-jet printer, especially small business and/or home users who require color printing. In addition, the MFPs, because of their increased functionality, consume more space than any one of the devices separately. As a result, these devices, if purchased at all, are once again relegated to a large common area where the device is shared by the office at large, resulting in the aforementioned productivity losses.

Accordingly, a need remains for an inexpensive optical scanner that consumes a minimum amount of additional space which, moreover, can operate in conjunction with existing low-cost ink-jet printers.

SUMMARY OF THE INVENTION

It is, therefore, an object of the invention to disclose a method and corresponding apparatus for adding scanning capability to an existing ink-jet printer with little or no additional space required.

Another object of the invention is to disclose an optical scanner which requires no alignment when operated in conjunction with an ink-jet printer mechanism.

A further object of the invention is to disclose an optical scanner which can accept cut-sheet and fan-fold paper.

A further object of the invention is to provide an apparatus which can be incorporated into an ink-jet printer to provide scanning capability in addition to the printing capability of the printer. In the preferred embodiment, the scanner is housed in an identical body to that of the removable ink cartridge of the printer. When the ink cartridge is mounted on the printer, it is operable to print on paper moving through the print media path of the printer. When the scanner is mounted on the printer, it is operable to scan images on the paper moving through the print media path.

Another object of the invention is to describe a method of adding the optical scanning capability to an existing ink-jet printer.

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT

Figure 1:
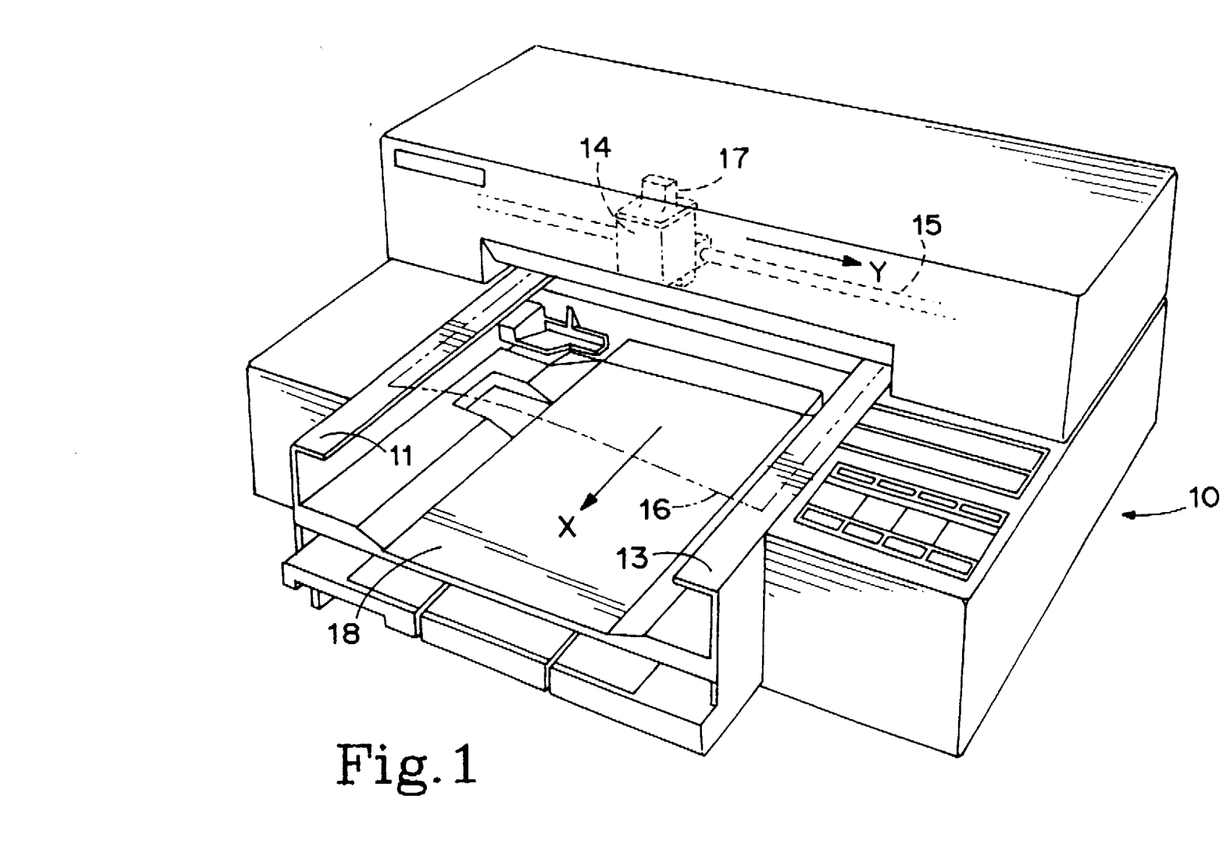
FIG. 1 is an ink-jet printer mechanism of the type having a moving carriage which passes over the print media.

Referring to FIG. 1, a printer mechanism is shown generally at 10. The printer mechanism has an internal frame, which defines the print media path 18, and a carriage 14 mounted on a fixed transverse rod 15. A sheet of paper 16 is shown passing through the print media path suspended on paper rails 11 and 13 along an X-axis. Not shown is the means for advancing the paper through the print media path, nor the means for advancing the carriage 14 along the fixed transverse rod 15. These techniques are well known in the art, e.g., gears and stepper motors. The printer mechanism 10 is typical of those used in ink-jet or dot-matrix type printers.

In the preferred embodiment of the invention, the scanner (not shown in FIG. 1) is substituted for an existing ink-jet ink cartridge 17 mounted on carriage 14. In an alternate ink jet printer embodiment having multiple carriages (not shown), the scanner can be substituted for one of the cartridges, while the others remain. The ink-jet cartridge contains a reservoir of ink and individual nozzles, through which the ink passes onto the print media, and a flexible circuit interconnect, through which the printer electronics (not shown) selectively enables, i.e., fires, each nozzle.

The flexible circuit interconnect consists of a flexible circuit with contact points and metal traces electrically connecting a contact and a corresponding nozzle. The contact points are sometimes raised to facilitate an electrical connection. The flexible circuit can also be used to communicate to other portions of the cartridge by routing a separate trace from the circuit to another portion of the cartridge, e.g., to an identification circuit which identifies the type of cartridge installed. Such interconnects are known in the art.

The carriage 14, in which cartridge 17 is housed, is movable on fixed transverse rod 15 along a Y-axis directly over the print media. As the carriage 14 advances along the frame, the appropriate nozzles are enabled thereby depositing ink at the point generally beneath the nozzle. Because the ink cartridges 17 eventually run out of ink, the cartridge must be replaceable. In order for the replacement cartridges 17 to maintain electrical contact with the printer electronics, the carriage 14 must be designed to allow the cartridge to fit snugly upon reinsertion. Therefore, the cartridge must adhere to the precise mechanical dimensions of the carriage 14.

Figure 2:
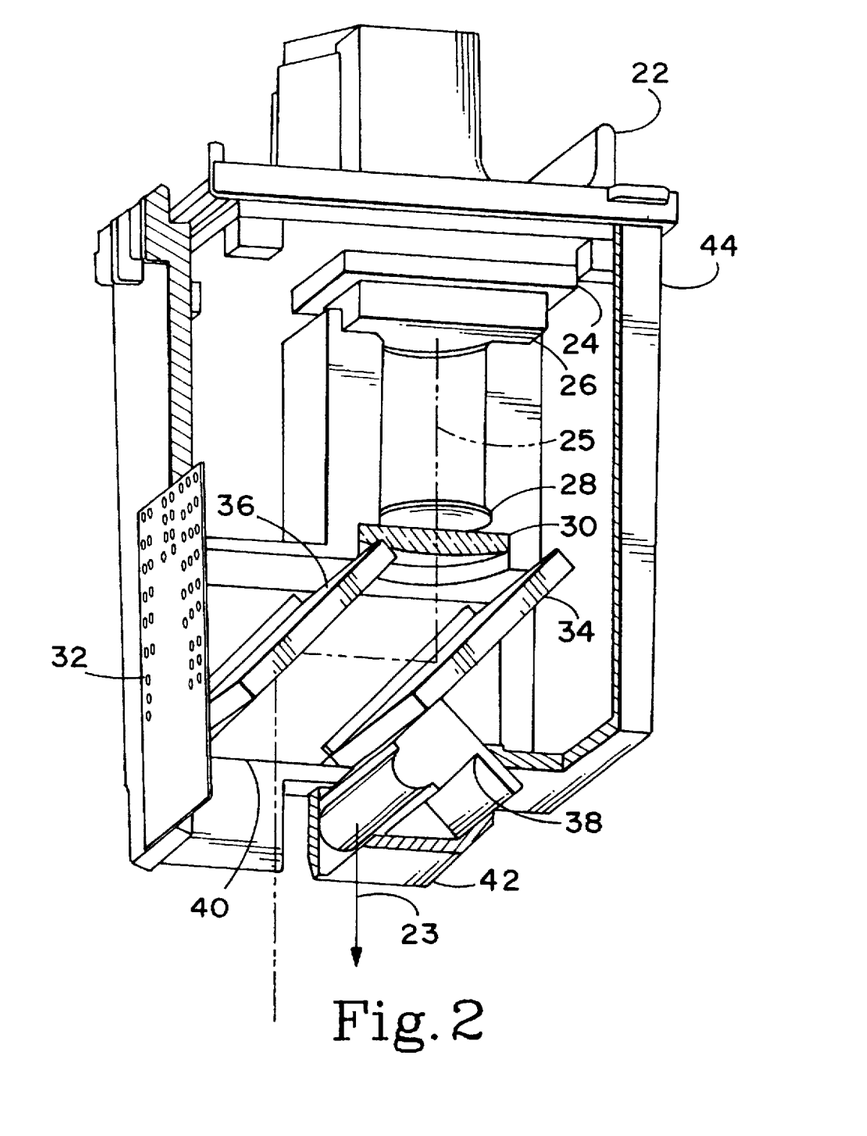
FIG. 2 is a cutaway view of the scanner body of a first embodiment of the present invention showing reflected light path through the scanner.

Referring to FIG. 2, a scanner is shown, according to the invention, housed in a scanner body 44 which adheres to the mechanical specifications of the carriage 14, allowing it to be inserted in place of the replaceable printer cartridge 17. The scanner is cut away to show an axis of reflected light path 25 through the body of the scanner. The reflected light originates on the scanner from an LED light source 38 along emitted light axis 23. Alternatively, an incandescent light source can be used, as well as many other suitable equivalents. The emitted light is projected along axis 23 onto an image below the scanner and the light is reflected back into the scanner, as shown by reflected light path 25. Each of the constitute elements of the scanner are shown separated from the scanner body 44 for better illustration in FIG. 3.

Figure 3:
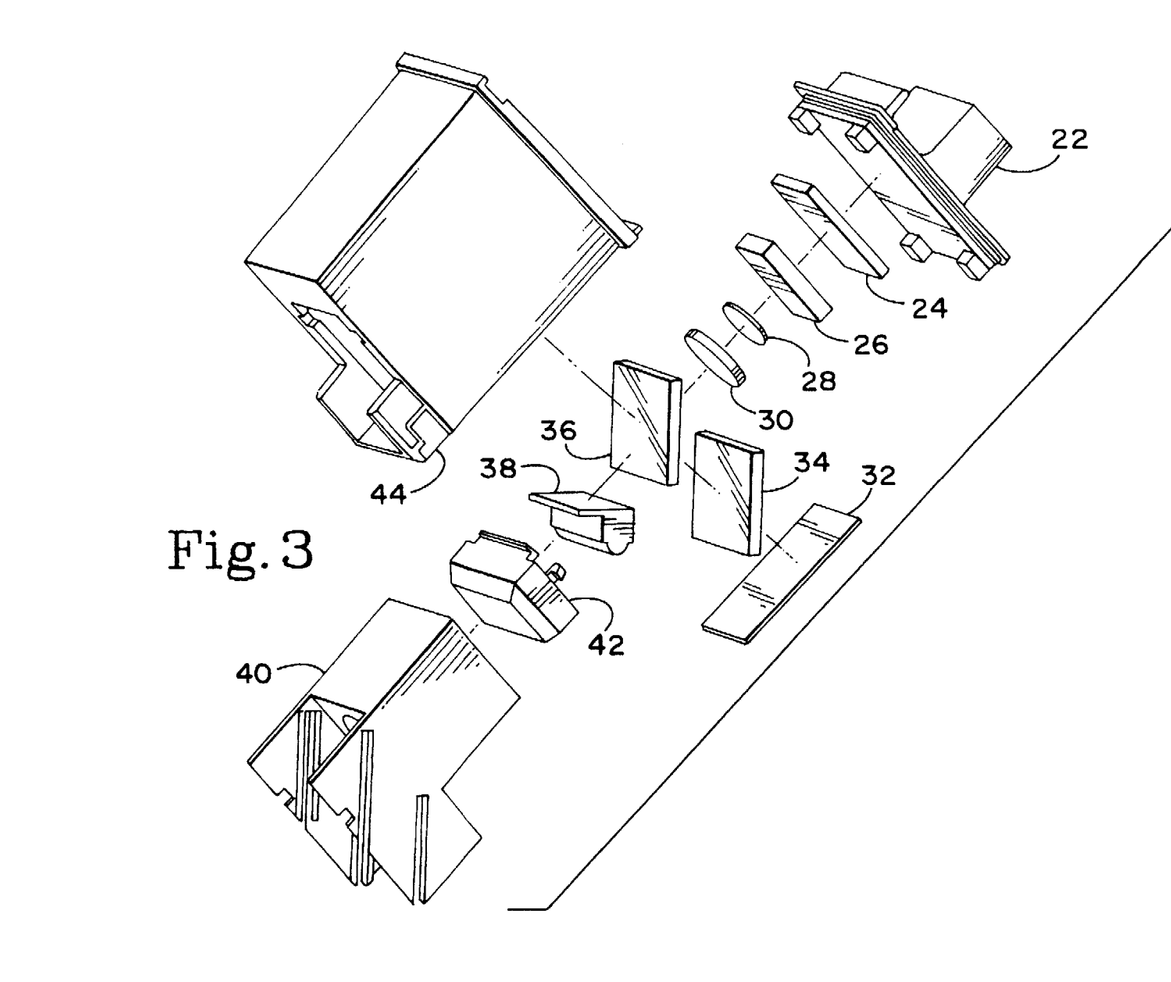
FIG. 3 is an exploded view of the scanner of FIG. 2 identifying each of the constituent parts thereof.

Referring to FIG. 3, a cartridge pen plug 22 is attached to the top of the scanner body 44 which is used to hold the scanner when inserting and removing the scanner from the carriage 14. Attached to the cartridge pen plug 22 is a printed circuit board (PCB) 24 which is electrically connected to both a flexible circuit interconnect 32 and a light receptor means, e.g., a charge coupled device (CCD) sensor, 26. Scanner electronics (not shown in FIG. 3), herein after described, are mounted on PCB 24.

A bi-convex lens 28 and plano-convex lens 30 are held by a lens mirror holder 40 and act to focus the reflected light onto the CCD sensor 26. An LED light source 38 is held in place by a LED holder 42. A first mirror 34 and a second mirror 36 are also held by the lens mirror holder 40 in order to direct the incoming reflected light onto the CCD sensor 26. The second mirror 36 directs the incoming light off its face at an angle dictated by the interior dimensions of the scanner cartridge and the orientation of the cartridge with respect to the image. The first mirror 34 reflects the light reflected off the second mirror 36 so that the light contacts the CCD 26 at a perpendicular angle.

In order to focus the image onto the CCD array, a focusing means is employed. In the preferred embodiment a bi-convex lens 28 and plano-convex lens 30 are held by the lens mirror holder 40 and act to focus the incoming light onto the CCD sensor 26. In an alternative embodiment, a simple convex lens can be used in reduction mode. If the simple convex lens is used the necessary lens dimensions can be calculated based on the simple lens maker's formula. The lens/mirror holder 40 is then modified to satisfy these dimensions.

In an alternative and preferred embodiment, a graded-index ("GRIN") fiber lens can be employed instead of the discrete lenses, which requires less space and weight. The GRIN lens is an array of cylindrical pieces of glass, each piece having metal ions implanted therein to create a gradient in the refractive index. The GRIN lens requires a shorter focal distance between the image and the image sensor than other lenses. GRIN lenses are known in the art of optics. A GRIN lens would allow for a direct optical path between the image and the sensor, rather than the extended optical path shown in FIG. 2.

In order to direct the incoming light into the CCD sensor 26, a light directing means is required. The light directing means not only accommodates the mechanical requirements of the cartridge but can also effectively increase the image distance. The light directing means comprises a the first mirror 34 and the second mirror 36, each held by the lens mirror holder 40 at a 45 degree angle with respect to the base of the scanner, although other mirror configurations, at different angles and/or using additional mirrors could be used to direct the light onto the light sensor. The second mirror 36 reflects the incoming light off its face at a 45 degree angle towards the first mirror, or parallel to the base of the scanner. The first mirror 34 reflects the light reflected off the second mirror 36 at an angle 45 degrees from its face, thereby causing the light to contact the CCD 38 at a perpendicular angle. If a GRIN lens is employed and a direct optical path design used, the first and second mirrors could be eliminated.

The light which is sensed by the CCD 26 is produced by the light source 38, which is held in place by LED holder 42, and reflected off the image below. The light source 38 is chosen based on the spectral response of the light receptor means. In the preferred embodiment, the peak relative response of the CCD 26 occurs at a wavelength of 675 nm. This is within the red region, hence, a red light is used. In addition, a light source 38 is chosen which will reduce the amount of interference due to ambient light, however, this is not critical.

The light source 38, e.g., consisting of six LEDs, each having a wavelength of 645 nm, such as the, HLMP-K101 manufactured by Hewlett Packard of Palo Alto, Calif., is biased to produce approximately 40 mcds of intensity. The LEDs are arranged in two rows, each row having three LEDs. Different types and arrangements of LEDs or lamps are possible to produce substantially the same results. Saturation of the CCD 38 can occur, however, with any light source 38 that has high output levels near the wavelength at which the light receptor means sensitivity peaks. Filters can be employed to counteract this problem, as is well known in the art.

The CCD 26 is a commercially available sensor which is used in a wide variety of light sensing applications. The CCD 26 consists of a linear array of detection sensors, hereafter referred to as pixels, each of which detects the light received at each corresponding pixel location. For example, the Toshiba TCD 104-D CCD consists of 128 such pixels each spaced 32 microns apart forming an array 4096 microns wide. The CCD array is mounted parallel to the axis of the print media path. Incorporated within the CCD is an analog shift register wherein the image pixel data is latched responsive to a shift signal received on a shift signal input of the CCD 26. Once the data is latched, the image data is shifted out serially with the use of two anti-phase clock signals.

Figure 4:
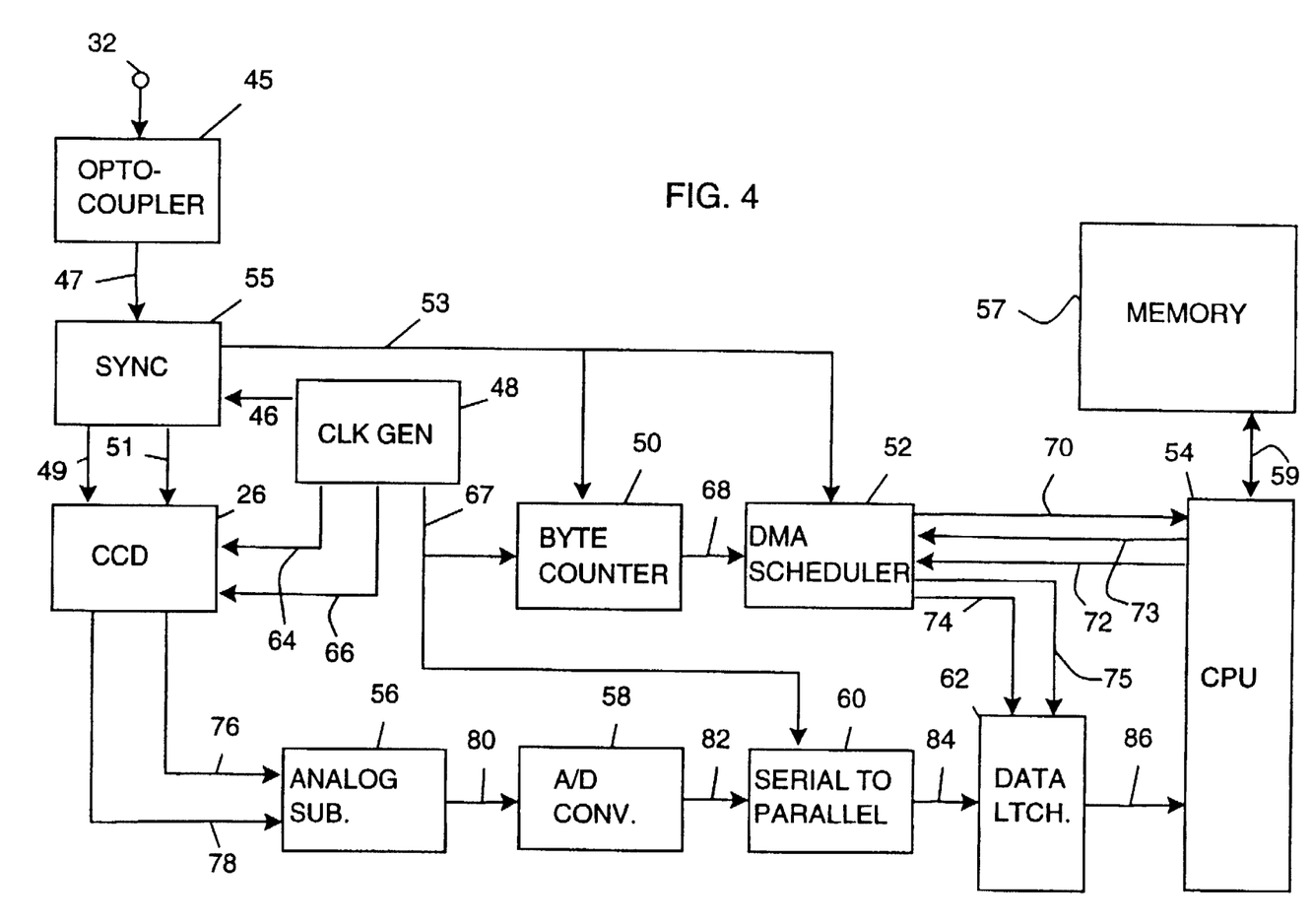
FIG. 4 is a block diagram of the scanner electronics for the scanner shown in FIG. 1.

The scanner electronics, which are mounted on the PCB 24, are shown schematically in FIG. 4 (excluding CPU 54 and memory 57). The basic function of the scanner electronics is to capture an image and transfer the corresponding image data to either a host PC for remote storage or to the printer electronics for local storage. The scanner electronics, therefore, have two modes of operation. A first mode transfers the image to a host PC where the image can be permanently stored on hard disk or can be modified. A second mode transfers the image to the resident memory in the printer for contemporaneous reproduction. Thus, in the second mode, the scanner/printer combination operates as a stand-alone copy machine, as described further below.

Although the image data is transferred to two separate destinations depending on the mode of operation, FIG. 4 is used to represent both. In the first mode, the CPU 54 resides in the host PC (not shown) and the image data is stored in memory 57. The memory 57 in the first mode can either be a permanent memory, e.g., hard disk, or a temporary memory, e.g., RAM. The memory 57 is coupled to the CPU 54 by data bus 59.

In the second mode, the CPU 54 and memory 57 exist in the printer itself. The image data stored in memory 57 can, therefore, be processed by the printer as if the data were received from the host PC as a print job. The CPU 54 may need to perform some pre-processing of the data, however, to make it compatible with the format anticipated by the printer.

The initial analog image is latched into the CCD 26 under the control of a synchronization circuit 55. The individual bits of the analog image are shifted out serially, under the control of a clock generator 48, to an analog subtractor 56, where the analog image is corrected. The corrected analog image is converted to a digital format with the use of a digital to analog converter 58 before being converted to a parallel format for transmission over data bus 86. The parallel data is transferred over the data bus under the control of a direct memory access schedule (DMA) controller 52.

The scanner electronics operate under the control of electronics in the printer (not shown in FIG. 4). The printer electronics interfaces with the scanner electronics over the flexible circuit interconnect 32. Since the printer electronics typically drive high voltages, e.g., 20 V, across the flexible circuit interconnect in order to drive the thin-film resistors of the ink-jet printhead, an opto-coupler 45 is required to reduce the voltage of the signals received over the interconnect 32 to a level usable by the scanner electronics, e.g., TTL compatible (5 V). The opto-coupler 45 produces a firing pulse on firing pulse line 47 which is coupled to synchronization circuit 55.

The firing pulse received by the synchronization circuit 55 is synchronized to the scanner electronics clock signal 46 received from clock generator 48. The clock generator circuit 48 generates several clock signals derived from a fixed clock source such as an oscillator. The minimum frequency of the oscillator is determined by the specifications of the CCD 26, as described below. The synchronization circuit 55 is connected to CCD array 26 through shift-pulse line 49 and reset-pulse line 51. In the preferred embodiment, the shift-pulse line 49 is connected to a shift input of the CCD 26 and the reset-pulse line 51 is connected to the reset input of the CCD 26. The shift-pulse line 49 is used to latch the image pixel data into the CCD 26, while the reset-pulse signal 51 is used to prepare the CCD for shifting the next bit of image data out of the CCD. The synchronization circuit is also connected to byte counter 50 and DMA scheduler 52 through initialization line 53, which is used to initialize both the byte counter 50 and the DMA scheduler 52 upon receipt of the firing pulse.

As described above, the scanner includes a CCD 26 organized as a linear array of light sensors. The CCD 26 shown in FIG. 4 transfers the light present on the individual sensors to an analog shift register within the CCD upon receipt of a shift pulse on the shift-pulse line 49. Once the data is latched, the image data, i.e, the image vector, is shifted out serially with the use of first and second anti-phase clocks 64 and 66 connected to the CCD 26 produced by the clock generator 48. The frequency at which the serial data can be shifted out is described by the following equation:

$$(N_S+N_D)F_{CLK} <= T_{INT}$$

where:

$N_S$ is the number of valid pixels, $N_D$ the number of dummy pixels, $F_{CLK}$ the clocking frequency of the analog shift register, $T_{INT}$ the CCD's integration time.

In the preferred embodiment, the CCD sensors are arranged perpendicular to the direction of the carriage motion. For a 300 dots per inch (dpi) printer, having a printhead traveling with a velocity of 12 inches per second (ips), the printhead will traverse 3600 dots per second (dps), i.e., 300 dpi*12 ips=3600 dps, which translates to 278 microseconds between adjacent dots. Within this period of time all of the CCD's pixels, both valid and dummy, must be shifted out, in order to prepare for the next vector of image data. In addition, the CCD's integration time ($T_{INT}$) must be less that the period between adjacent dots. For the Toshiba TCD104-D CCD, the total number of pixels is 148, producing a minimum frequency of:

$$F_{CLKmin}=148 \text{ dots}/278 \text{ microseconds}=0.53 \text{ MHz}$$

However, this frequency does not take into account propagation delays of the various logic gates through which the image data element passes. The two anti-phase clocks 64 and 66 are derived from a standard divide-by-four circuit within the clock generator 48, requiring a minimum crystal frequency of 2.12 MHz. The use of a divide by 4 circuit facilitates generating all clocking signals required by the CCD 26. In order to provide a degree of safety margin, however, a 5 MHz crystal oscillator is used in the clock generator 48 to create the required clock signals.

The serial data of CCD 26 is produced on two analog outputs, a video output (OS) 76 and a dark signal output (DOS) 78, which are both connected to analog subtractor 56. The video output OS 76 corresponds to the current image data bit being shifted out of the analog shift register. The dark signal output DOS corresponds to the CCD's inherent dark signal error. In order to eliminate the dark signal error, the analog subtractor subtracts the DOS from the OS to produce a compensated analog video output 80. The analog subtractor 56 can be implemented using a differential amplifier such as a LM318 manufactured by National Semiconductor of Santa Clara, Calif.

The compensated analog video output 80 is connected to an analog to digital converter (A/D) 58 in order to produce a digital image data bit capable of being read by the host computer. In the preferred embodiment, the A/D converter 58 is a one bit black/white comparator, such as the LM306 manufactured by National Semiconductor, whose threshold is set to distinguish between "black and white" images. The first input of the comparator would receive the compensated video output 80 and the other would receive a predetermined threshold voltage. The threshold voltage can be variable by using a potentiometer to set the level, in order to tune the comparator to the operating conditions of the circuit and the ambient light. The digital image on the digital image output line 82 of the A/D converter 58 is either high or low, corresponding to a black or white pixel image, respectively. In an alternate embodiment (not shown), an A/D converter can provide a grey-scale image wherein the number of grey scales depends on the resolution of the A/D converter.

The digital image output line 82 of the A/D converter 58 is connected to a data input of a serial to parallel converter 60. The digital image data on the digital image output line 82 is clocked into the serial to parallel converter 60 responsive to a clock signal received on clock line 67, from the clock generator 48, connected to the serial to parallel converter 60. The serial to parallel converter, in the preferred embodiment, is an 8-bit serial-in parallel-out shift register such as an 74LS164 manufactured by Texas Instruments of Dallas, Tex. The parallel output 84 of the serial to parallel converter 60 is connected to a data latch 62 such as an 74LS374 manufactured by Texas Instruments. Once an entire byte has been received in the serial to parallel converter 60, the parallel output 84 of the serial to parallel converter 60 is latched into a data latch 62, to be held until DMA scheduler 52 can transfer the latched byte to the CPU 54. In order to avoid overflowing the serial to parallel converter 60, the DMA scheduler 52 must be able to transfer one byte in the time required to shift in a new byte into the serial to parallel converter 60.

A byte counter 50 is used to monitor the number of bits shifted into the serial to parallel converter 60. Therefore, the byte counter 50 and the serial to parallel converter 60 are connected to the same clock line 67 produced by the clock generator 48. Once the correct number of bits is reached, e.g., 8-bits, the byte counter 50 indicates to DMA scheduler 52, via the output byte indicator line 68 connected between the byte counter 50 and DMA scheduler 52, that the data is ready to be latched into data latch 62. When the output byte indicator line 68 is asserted, the DMA scheduler 52 issues a latch signal over latch line 74 connected to the data latch, which causes the data present on parallel output 84 to be latched into the data latch 62. In addition, responsive to the output byte indicator 68, the DMA scheduler 52 increments a counter to maintain a count of the number of bytes transferred since the receipt of the an initialization signal on initialization line 53. The DMA scheduler 52 thereby keeps track of the number of bytes of the current image vector that have been transferred to the CPU 54.

A DMA scheduler 52 is used to arbitrate and handshake the digital image data to the CPU 54. Connected between the DMA scheduler 52 and the CPU are three DMA control lines: DMA request (DREQ) 70, DMA acknowledge (DACK) 72, and terminal count (TC) 73. These DMA control lines are representative of the control lines necessary to handshake the image data. The number and purpose of each will vary depending on the particular microprocessor being used. The DMA scheduler 52 arbitrates for the data bus by asserting the DMA request line (DREQ) 70 when a byte is ready to be transferred to the CPU. The CPU responds by asserting the DMA acknowledge line (DACK) 72 to indicate to the DMA 52 scheduler that the CPU 54 is no longer driving the bus. The DMA scheduler 52 enables the data latch 62 responsive to the DACK 72 assertion, by setting the output enable signal active on the output enable line 75, driving the contents of the data latch 62 onto the data bus 86. The CPU 54 latches the data and transfers it to a predetermined memory 57 location, which the CPU established by configuring its own DMA controller.

There are two distinct methods of transmitting the image data from the scanner electronics to the host PC. The first, and preferred, method uses an existing I/O channel between the printer and the host PC such as a bi-directional Centronics (IEEE P1284), RS-232, or a high-speed infra-red I/O. By using the existing I/O communication channel between the printer and the host PC, there is no need for a separate interface card in the host PC nor an additional cable.

The image data is transmitted to the printer CPU via the flexible interconnect 32 either as a serial bit stream out of the serial to parallel converter 60 or as a parallel byte out of the data latch 62. Additional multiplexing circuitry (not shown in FIG. 4) is required to multiplex the image data and DMA control signals, described further below, over the flexible interconnect 32. The printer CPU receives the data over the flexible interconnect 32, packetizes the data according to the I/O channel protocol, and transmits the data across the I/O channel using the corresponding handshake. If the printer is operating in the "copy" mode, i.e., the second mode of operation, the printer CPU would simply route the image data to its resident memory.

The second method of transmitting the image data from the scanner electronics to the PC requires a PC interface card to be installed in the host PC. The interface card is a industry standard board which plugs into the PC backplane thereby gaining access to the entire PC bus including the DMA control signals and the data bus. The required DMA control signals 70, 72, 73 and the data bus 86 are coupled from the PC interface card to the scanner cartridge 44 through an electrical cable (note shown). The cable can be made to couple to either the flexible circuit interconnect 32 or to the printed circuit board 24 directly.

Prior to beginning a DMA transfer, the host PC DMA controller (not shown in FIG. 4) must be configured. The host PC DMA controller, i.e., Intel 8237 DMA controller, must be set in a single transfer mode where a single byte is transferred per request. In order to accomplish this the following actions on the DMA controller must be performed prior to the DMA request:

1). Clear the 8237 internal flip-flop.
2). Select single transfer mode operation.
3). Select auto address increment.
4). Disable auto reload (init).
5). Set page register.
6). Select DMA channel.
7). Specify destination address.
8). Set number of bytes to transfer.
9). Enable DMA transfer.

Software operating on the host PC required to accomplish these tasks is readily known to those skilled in the art and, as such, is not disclosed in the course of this invention.

Once an entire band wide scan, or swath, of data has been transferred into the host PC's memory, the CPU 54 is notified and is able to begin processing the information, further DMA transfers are inhibited until the beginning of the next scan, at which point the entire process is repeated. A terminal count signal is generated by the host DMA controller and transmitted over the terminal count line 73 when the specified number of bytes is transferred within the current DMA cycle. The TC is combined with DACK within the DMA controller 52 to disallow further DMA requests until the next initialization phase.

According to the invention, the scanner shown in FIG. 2 is substituted for the removable ink-jet cartridge 17 of the printer. Built into the scanner cartridge is a means for uniquely identifying the cartridge as a scanner cartridge. This is accomplished by having a unique identification pattern, i.e., I.D. bits, that can be read by the printer electronics off the flexible interconnect. The I.D. bit lines are terminated at the scanner by coupling the lines to either power or ground through terminating resistors, to form a binary pattern corresponding to the I.D. sequence of the cartridge. Typically, two or more traces of the flex interconnect are dedicated to this purpose. Before a scanning operation can commence, the host PC must also detect the presence of a scanner bus interface card, in order to communicate with the scanner electronics. The scanner bus interface card (not shown) inserts into the backplane of the PC thereby making electrical contact to the PC control and data busses. The scanner bus interface card contains the necessary buffering and decode logic to allow the scanner to interface to the PC across the data bus. In the preferred embodiment of the invention, the computer automatically senses the presence of the bus interface card by detecting a transition on the direct memory access (DMA) request line (DREQ), described in further detail below. However, the bus interface card can also be polled by the host PC at a predetermined address to determine its presence.

Once the scanner cartridge is identified by the printer electronics and the scanner interface card is recognized by the host PC, the scanning sequence can then be instigated by the user at the host PC by requesting a scanning operation. The image to be scanned is loaded into the input tray of the printer and the scanning operation request is input to the host PC. The host PC then transfers a request to the printer, in the form of a predetermined escape sequence, over the I/O channel to begin the scanning operation.

In general, the scanning operation for each swath covered by the scanner proceeds as follows. The printer feeds the print media, i.e., image, along the print media path until the top of the media is registered under the carriage. A predetermined nozzle location on the flex interconnect is "fired" creating a pulse which the scanner electronics uses to initiate a scanning sequence of the current image pixels covered by the scanner. The pixels are shifted out serially from the CCD array, converted to a digital format, and packed into bytes, which are then transferred over the PC bus to the host PC. The carriage is then advanced to the next image pixel and the nozzle is fired again, causing the sequence to be repeated. In the preferred embodiment, the CCD sensor 26 is arranged to capture a vertical column of the image 128 pixels high and a single pixel wide. In addition, the CCD sensor 26 includes 16 dummy pixels in its output analog shift register which must be shifted out before the actual image data can be accessed. The flow chart illustrating the corresponding sequence is shown in FIG. 5.

Figure 5:
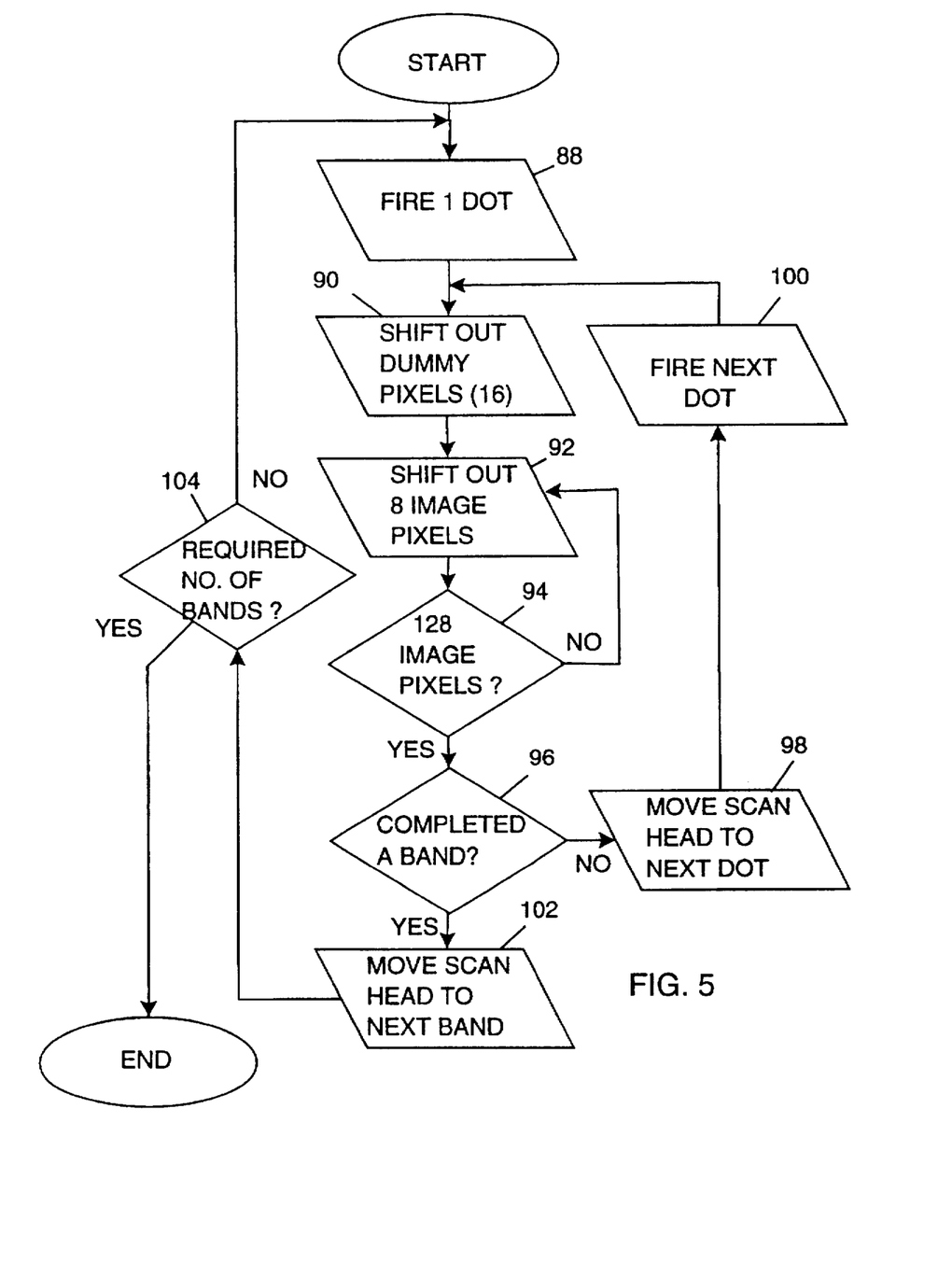
FIG. 5 is a flow-chart diagram showing the imaging sequence of the invention.

Referring to FIG. 5, a flowchart showing the overall sequence of the scanning operation is shown. The sequence begins by firing a first dot in step 88 after the print media has been registered. The firing pulse is received by the scanner electronics through the flexible interconnect 32 and used to latch the image data in the CCD array after being synchronized, as described above. The sixteen dummy pixels are then shifted out of the CCD analog shift register in step 90 and discarded. The first eight bits of the actual image are then shifted out in step 92 of the CCD analog shift register and, after being converted to a digital format, are transferred to the PC via direct memory access. The image data continues to be shifted out eight bits at a time in step 94 until the entire 128 bits of the CCD array have been shifted out. After the CCD shift register has been shifted out, if the entire band has not been scanned (step 96), the printer controller advances the carriage 14 horizontally by a single image dot is step 98, i.e., pixel, and the sequence is repeated, including firing of a nozzle 100, until an entire horizontal band of the image is scanned. The print media is then advanced along the print media path 16 by 128 pixels in step 102 and the process is repeated until all of the horizontal bands of the image are scanned.

Having described and illustrated the principles of the invention in a preferred embodiment thereof, it should be apparent that the invention can be modified in arrangement and detail without departing from such principles.

We claim all modifications and variation coming within the spirit and scope of the following claims:

1. An ink jet apparatus for scanning and copying an optical image, comprising:

an apparatus frame defining a print media path;

means for advancing print media along the media path;

a carriage mounted on the frame for traversing the media path in order to scan a print media advanced along the media path, said carriage including a holder for releasably mounting at least one ink jet print head cartridge for printing upon print media transported adjacently thereto by said means for advancing along the media path, said holder having a first electrical connector, said ink jet print head cartridge having a body having a predetermined shape and a second electrical connector mounted thereon for connecting to said first electrical connector, printer electronics operatively connected to the holder to provide print signals to the ink jet print head via said first electrical connector and said second electrical connector when said print head is mounted in said holder;

a scanner cartridge, including
a mechanism to optically scan an image recorded print media transported along the media path,
a scanner body adapted to be releasably mounted by said holder and having a substantially identical predetermined shape as said cartridge, an identification circuit that encodes a scanner identification signal automatically readable by the printer electronics upon insertion of said scanner cartridge, an electrical interconnect mounted on the scanner body and operatively connected to the printer electronics via said first electrical connector when said scanner body is mounted in said holder to communicate a scanner identification code and scanner data to the printer electronics, and means for automatically selecting between either optically scanning an image recorded on said print media transported along the media path when the scanner body is mounted in the holder and the scanner identification code is read by the printer electronics or printing upon media transported along the media path when the ink jet print head is received by the holder and the scanner identification number is not read by the printer electronics.

2. The apparatus of claim 1 wherein the scanner body further comprises:

a scanner housing mounted on the carriage for optically scanning media received in the media path;

an aperture in the scanner housing through which emitted and reflected light passes;

a light source mounted on the scanner housing, able to emit light through the aperture;

a light receptor mounted on the housing;

means for converting light to electronic data mounted on the housing and being operative connected to the light receptor means; and means for focusing light mounted on the housing for focusing light onto the light receptor means.

3. The apparatus of claim 2 wherein the scanner further comprises;

a first mirror offset by a first angle relative to the print media when received in said print media path so that the emitted light reflected off the print media reflects off the first mirror at a second angle; and a second mirror oriented substantially parallel to the first mirror so that light reflected off the first mirror reflects off the second mirror toward the light receptor, with the light reflected off the second mirror being parallel to the light reflected off the print media.

4. The apparatus of claim 2 wherein the light source comprises;

an LED light source.

5. The apparatus of claim 2 wherin the light source comprises;

an icandescent lamp.

6. The apparatus of claim 2 wherein the light receptor means comprises;

a CCD array.

7. The apparatus of claim 2 wherein the means for focusing light comprises;

a graded index (GRIN) lens.

8. The apparatus of claim 2 wherein the means for focusing light comprises:

a bi-convex lens and a plano-convex lens.

9. The apparatus of claim 2 wherein the scanner further comprises:

means for transmitting the electronic data to the printer electronics over the electrical interconnect.

10. A combined ink jet printing and copying apparatus comprising:

an ink jet printer; having a frame defining a print media path, a carriage mounted on a horizontal axis for longitudinal movement across the print media path, and at least one ink jet printing cartridge removably mounted on the carriage and having a first electrical interconnect, and a central process unit (CPU) operatively connected to the printing cartridge electrical interconnect for controlling the printing of images on print media transported along the print media path by transmitting print signals to the printing cartridge through the cartridge electrical interconnect;

a scanner cartridge adapted to be mounted in said carriage either in place of or adjacent to a said ink jet printing cartridge for scanning an image on print media transported along the print media path, the scanner cartridge including a scanner housing mountable on the carriage, the housing having an aperture for transmitting scanning light and receiving light reflected off the print media, a scanner electrical interconnect mounted on the scanner housing and operatively coupled to the CPU when the scanner cartridge is mounted in said carriage, a resistor array mounted on the housing which encodes an identification code of the scanner cartridge, wherein said identification code is automatically read by the CPU through the scanner cartridge electrical interconnects thereby identifying the scanner cartridge to the CPU and enabling a scanning mode of operation, a light source mounted within the housing for emitting light through the aperture onto the media such that the emitted light is reflected off of images on the media and received through the aperture, a light sensor mounted within the housing for sensing the reflected light and converting the sensed light to uncompensated analog signals, means mounted within the housing and operatively connected to the light sensor for converting the uncompensated analog signals to image data, means mounted within the housing and for transmitting the image data to the CPU via the scanner electrical interconnect;

means for storing the image data; and means for printing the stored image data.

11. The apparatus according to claim 10 wherein the converting means comprises:

an analog subtractor connected to the light sensor for compensating uncompensated analog signals to produce compensated analog signals; and an analog-to-digital converter operatively connected to the subtractor for converting the compensated analog signals to the image data.

12. The apparatus according to claim 10 further comprising:

means for transmitting the stored image data to a host personal computer.

13. The apparatus according to claim 10 further comprising:

means for transmitting the stored image data to a host personal computer including a flexible interconnect circuit connecting the converting means and the printer CPU; and an input-output (I/O) cable connecting the printer and the personal computer.

14. The apparatus according to claim 10 further comprising:
- means for transmitting the stored image data to a host computer, including
  - a bus-interface card inserted into the backplane of the personal computer;
  - an input-output (I/O) cable connecting the bus-interface card and the converting means; and
  - a direct-memory-access controller for coordinating the transfer of digital signals from the converting means to the personal computer.

15. A method of copying an image using an ink jet printer, said printer having at least one ink jet cartridge adapted to be releasably mounted in a print media scanning carriage and printer electronics electrically coupled to said ink jet cartridge via an electrical interconnect mounted on the cartridge, said printer having a printing mode operable by placing a printing media in the printer and transmitting printer command signals to the ink jet cartridge through the electrical interconnect mounted on the cartridge so as to cause the ink jet cartridge to print an image on said printing media, the method of copying an image comprising the steps of:
- placing print media in the printer; said print media having an image to be copied recorded thereon;
- removing the ink jet cartridge from the carriage;
- placing a scanner cartridge in the carriage, said scanner cartridge having an electrical interconnect mounted on said scanner cartridge;
- automatically identifying said scanner cartridge as a scanner cartridge to said printer electronics and initiating a scanning mode;
- scanning the image with the scanner cartridge so that image data is generated which represents the image;
- transmitting said image data to the printer electronics via the scanner cartridge interconnect;
- storing the image data received from the scanner cartridge in memory resident in the printer;
- removing the scanner cartridge from the carriage;
- replacing the ink jet cartridge in the carriage;
- automatically identfying the ink jet cartridge as an ink jet cartridge to said printer electronics and initiating a printing mode; and
- printing the image data.

16. A method of copying an image using an ink jet printer having an ink jet cartridge replaceably mounted on a carriage, the method comprising the steps of:
- placing print media in the printer; said print media having an image to be reproduced thereon;
- removing the ink jet cartridge from the carriage;
- placing a scanner cartridge in the carriage;
- automatically recognizing a current cartridge as a scanner cartridge;
- automatically scanning the image with the scanner cartridge so that image data is generated which represents the image;
- storing the image data in memory resident in the printer;
- removing the scanner cartridge from the carriage;
- placing the ink jet cartridge in the carriage.
- automatically recognizing a current cartridge as an ink jet cartridge; and
- automatically printing the image data.

17. A method of copying an image according to claim 16 further comprising the steps of:
- transmitting said image data to a computer.

18. A method of copying an image according to claim 17 wherein the step of transmitting said image data to a computer further comprises:
- transmitting the image data over an input-output (I/O) channel between the printer and the computer.

19. A method of copying according to claim 17 wherein the step of transmitting said image data to a computer further comprises the step of:
- transmitting the image data to the computer using direct memory access (DMA).

20. A method copying an imagae according to claim 16 wherein the step of scanning the image with the scanner cartridge so that image data is generated which represents the image further comprises the steps of:
- emitting light through an aperture in the scanner cartridge;
- detecting the emitted light reflected on the print media;
- converting the detected light to analog signals; and
- converting the analog signals to image data.

21. A method of copying an image according to claim 16 wherein the step of converting the analog signals to image data further comprises the steps of:
- subtracting compensation signals from the analog signals; and
- converting the analog signals to digital signals.

22. A method of copying an image according to claim 16 wherein the step of automatically recognizing a current cartridge as a scanner cartridge further comprises the steps of:
- reading an identification number on said scanner cartridge via said electrical interconnect; and
- scanning the image with the scanner cartridge when a selected scanner identification code is read.

23. A method of copying an image according to claim 16 wherein the step of scanning the image with the scanner cartridge so that image data is generated which represents the image further comprises the steps of:
- generating a pulse;
- transmitting the pulse over the electrical interconnect; and
- initiating the scanning to receipt of the pulse.

24. The method as set forth in claim 16, said step of automatically scanning further comprising the steps of:
- automatically determining a required number of scans to obtain scanned image data for an entire image to be copied;
- automatically terminating said scanning mode when data for an entire image has been stored; and
- automatically printing an entire image stored.

* * * * *

UNITED STATES PATENT AND TRADEMARK OFFICE
CERTIFICATE OF CORRECTION

PATENT NO. : 5,767,988  
DATED : June 16, 1998  
INVENTOR(S) : Dobbs, et al

Page 1 of 2

It is certified that error appears in the above-identified patent and that said Letters Patent is hereby corrected as shown below:

In the Abstract

Line 17, after "second" insert --,--.

Column 3, (line 40), after "cartridge" insert --17--.

Column 6, (line 67), delete "divide by 4" and insert therefor --divide-by-four--.

Column 7, (line 2), delete "CCD26" and insert therefor --CCD 26--.

Column 8, (line 19), delete "52 scheduler" and insert therefor --scheduler 52--.

In the Claims

Column 11, (line 67), after "printer" delete ";".

Column 13, (line 24), delete ";" and insert therefor --,--.

Column 13, (line 51), delete ";" and insert therefor --,--.

Column 14, (line 2), delete "," and insert therefor --;--.

UNITED STATES PATENT AND TRADEMARK OFFICE
CERTIFICATE OF CORRECTION

PATENT NO. : 5,767,988
DATED : June 16, 1998
INVENTOR(S) : Dobbs, et al

It is certified that error appears in the above-identified patent and that said Letters Patent is hereby corrected as shown below:

Column 14, (line 20), after "method" insert --of--.

Column 14, (line 20), delete "imagae" and insert therefor --image--.

Column 14, (line 50), after "scanning" insert --responsive--.

Signed and Sealed this

Fifth Day of January, 1999

Attest:

*Attesting Officer*

*Acting Commissioner of Patents and Trademarks*